Feb. 11, 1964
L. W. HOLCER
3,120,887
HAY BALE LOADER
Filed Oct. 23, 1961
2 Sheets-Sheet 1
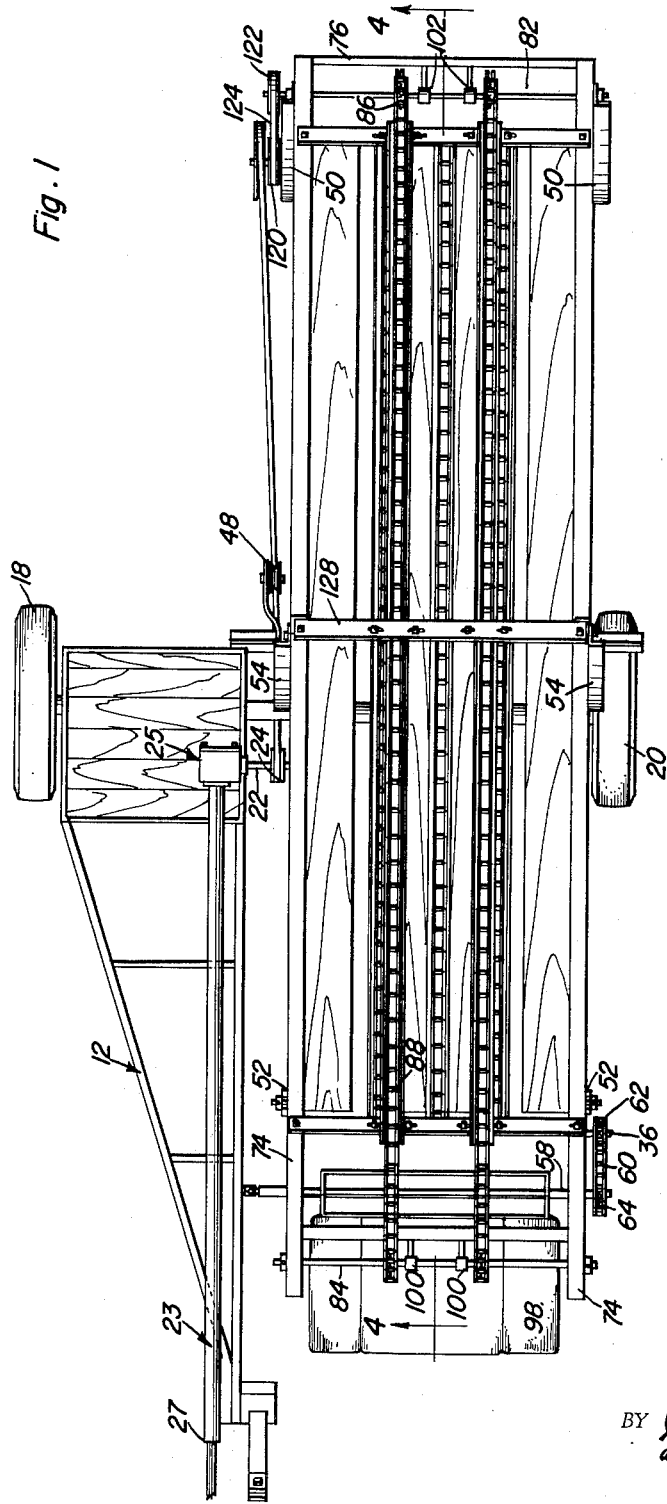
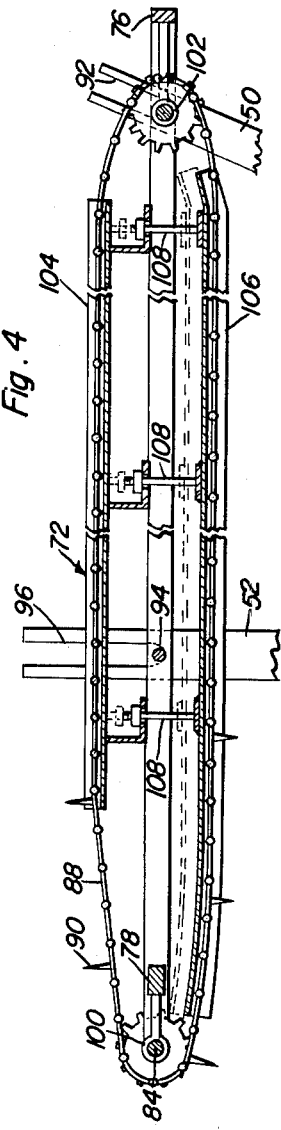
Levi Wendell Holcer
INVENTOR.

Feb. 11, 1964 — L. W. HOLCER — 3,120,887
HAY BALE LOADER
Filed Oct. 23, 1961 — 2 Sheets-Sheet 2
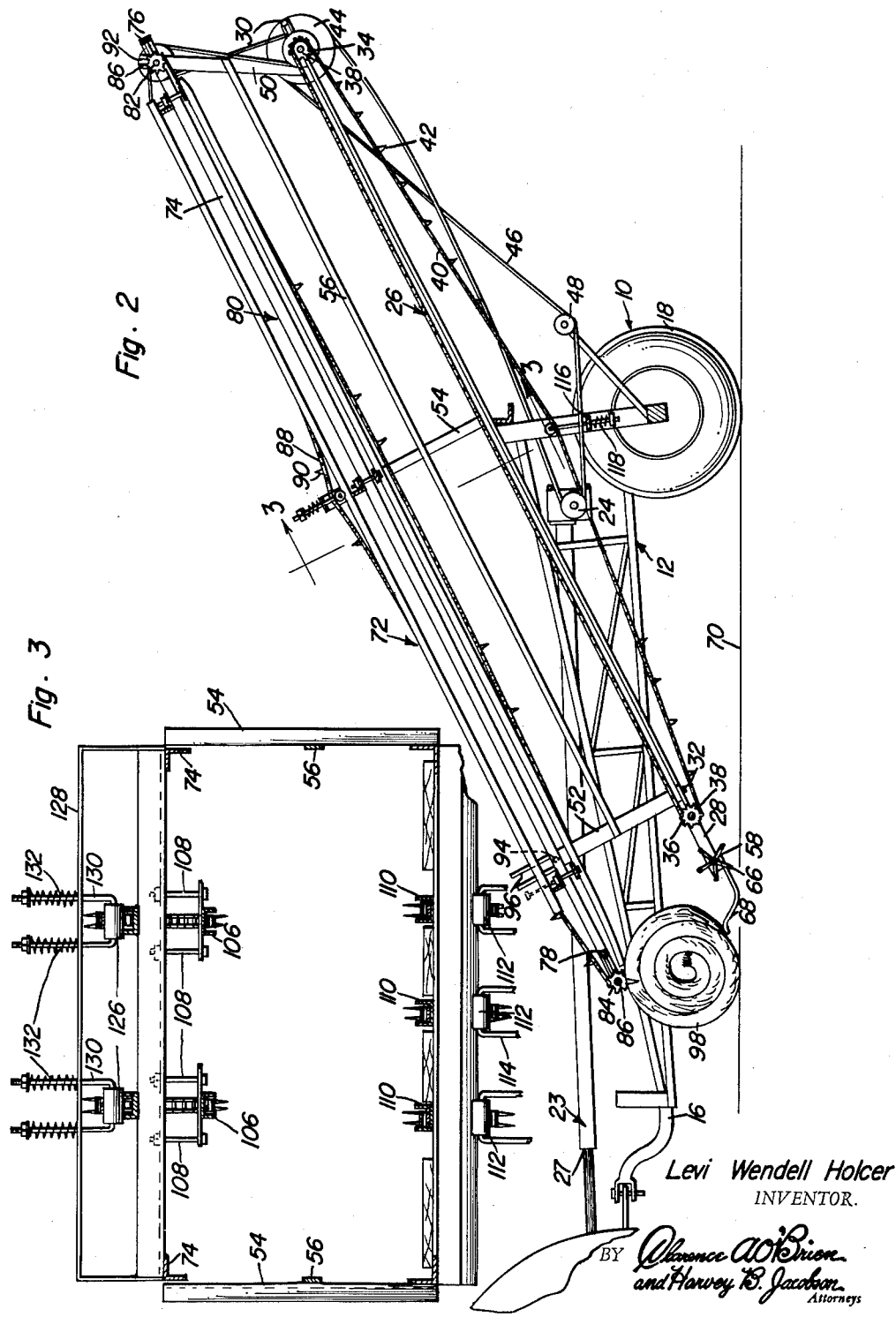
Levi Wendell Holcer
INVENTOR.

United States Patent Office 3,120,887
Patented Feb. 11, 1964

3,120,887
HAY BALE LOADER
Levi Wendell Holcer, Meadville, Mo.
Filed Oct. 23, 1961, Ser. No. 146,918
8 Claims. (Cl. 198—7)

This invention relates to a novel and useful hay bale loader and more specifically to a hay bale loader primarily designed for the purpose of picking up rolled round bales of hay and conveying the latter to a point of discharge disposed above a collection point such as a load trailer.

While the hale bale loader of the instant invention has been primarily designed for handling round hay bales, it is also fully capable of efficiently handling square bales.

While square bales are usually tightly compressed and bound with wire and may be quite roughly handled without tearing the bale apart, round bales are tied by wrapping binder twine around the bale. When the bale falls from a baling machine the twine is cut leaving one end loose and whenever the bale is rolled along the ground in a direction opposite to the direction in which the twine is wound about the bale the twine tends to unwind or unroll from the bale and if the latter is rolled far enough the entire twine will come off the bale and the latter will unroll and become a row of loose hay or straw. If the round bale is rolled in the same direction in which the twine is wound about the bale, the twine still tends to become loosened and thus makes it possible for the rolled bale to come apart.

Conventional hay bale loaders have a tendency to bump or push rolled bales along smooth ground surfaces and as a result tend to unwind the twine wound about a round roll resulting the latter falling apart.

The main object of this invention is to provide a hay bale loader provided with means for picking up a round bale of hay as well as a square bale of hay in a manner whereby the bale of hay being handled will not be rolled in either direction from the time the hay bale loader first engages the hay bale until the time the bale of hay handled by the hay bale loader is discharged at a collection point.

A further object of this invention, in accordance with the preceding object, is to provide a hale bale loader having a pair of laterally spaced, elongated and generally parallel endless conveyor assemblies for sandwiching a bale of hay and conveying the latter to a point of discharge from its initial pickup point. In this manner, the hay bale may be conveyed without any danger of the hay bale being rolled or re-oriented relative to the hay bale loader in any manner other than along the conveyor assemblies.

A still further object of this invention is to provide a hay bale loader with a pair of laterally spaced endless conveyor assemblies constructed in a manner whereby the conveyor assemblies are adapted to efficiently handle different sizes of round hay bales.

A final object to be specifically enumerated herein is to provide a hay bale loader in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the hay bale loader of the instant invention;

FIGURE 2 is a longitudinal vertical sectional view of the hay baler taken substantially upon a plane passing through the longitudinal centerline thereof;

FIGURE 3 is an enlarged transverse vertical sectional view taken substantially upon the plane indicated by the section line 3—3 of FIGURE 2; and FIGURE 4 is an enlarged fragmentary vertical sectional view of the upper conveyor assembly of the hay bale loader taken substantially upon a plane passing through the longitudinal centerline of the conveyor and with parts of the upper conveyor assembly being broken away.

Referring now more specifically to the drawings the numeral 10 generally designates the hay bale loader of the instant invention. The hay bale loader 10 includes a wheeled trailer frame generally referred to by the reference numeral 12 and the frame 12 includes a tow bar 16. Additionally, the frame 12 is provided with a pair of ground-engaging wheels 18 and 20 and it will be noted from FIGURE 1 of the drawings that the trailer frame 12 includes a power take-off shaft 22 which is drivingly connected to the drive shaft 23 by means of a gear box 25 and is provided with a pulley 24. The forward end of the drive shaft 23 includes a slip joint 27 and may be drivingly connected to the power take-off shaft (not shown) of a tractor towing the hay bale loader 10.

A rearwardly and upwardly inclined lower conveyor assembly is generally referred to by the reference numeral 26 and may be secured to the frame 12 in any convenient manner. The conveyor assembly 26 includes a pair of elongated opposite side frame members 28 which are interconnected at opposite ends by means of transverse frame members 30 and 32. A pair of transverse shaft members 34 and 36 are rotatably journaled between the side frame members 28 at opposite ends of the conveyor assembly 26 and each is provided with three transversely spaced sprocket wheels 38 about which three endless flexible members 40 are entrained. The endless flexible members 40 are provided with outwardly projecting bale-engaging elements 42. The shaft 34 has a driven pulley 44 secured thereto which is drivingly connected to the drive pulley 24 secured to the output shaft 22 by means of an endless flexible member 46 which also is entrained about a tensioning pulley 48 supported from the frame 12.

The conveyor assembly 26 also includes a pair of rear substantially vertical uprights 50 which are spaced transversely of the conveyor assembly 26 and a pair of forward transversely spaced uprights 52. Additionally, intermediate uprights 54 are disposed on opposite sides of the conveyor assembly 26 and the uprights 50, 52 and 54 are rigidly interconnected at points spaced from the side frame members 28 by means of a bracing member 56.

From FIGURES 1 and 2 of the drawings it will be noted that a pickup drum shaft 58 is also journaled for rotation about a horizontally disposed transversely extending axis between the forward ends of the side frame members 28 and is drivingly connected to the shaft 36 by means of a flexible chain 60 entrained over alined sprocket wheels 62 and 64 carried by the shaft 36 and the shaft 58. The drum or shaft 58 has a plurality of radially and outwardly projecting ribs 66 which extend longitudinally thereof. In addition, a pair of laterally spaced skid elements 68 are carried by the forward ends of the side frame members 28 and are adapted to engage the ground 70 in order to properly position the forward end of the conveyor assembly 26 the desired spaced distance above the ground 70.

The hay bale loader 10 also includes an upper elongated and rearwardly and upwardly inclined conveyor assembly generally referred to be the reference numeral 72.

The upper conveyor assembly 72 generally parallels the conveyor assembly 26 and includes a rectangular mounting frame having a pair of opposite side frame members 74 and opposite end frame members 76 and 78. The rectangular frame which is generally designated by the reference numeral 80 is snugly received between the upper ends of the uprights 50, 52 and 54 and the conveyor assembly 72 also includes a pair of rotatably supported transverse shafts which are referred to be the reference numerals 82 and 84 and are carried by the opposite ends of the frame 80. A pair of laterally spaced sprocket wheels 86 is carried by each shaft 82 and 84 and a pair of elongated flexible endless members 88 are entrained over corresponding pairs of sprocket wheels 86 and include outwardly projecting bale-engaging elements 90 similar to bale-engaging elements 42.

The opposite ends of the shaft 86 are slidably received in the upwardly opening notches 92 formed in the upper ends of the uprights 50 and the side frame members 74 each include a laterally and outwardly projecting pin 94 at its forward end which is slidably received in the upwardly opening notch 96 formed in the corresponding upright 52.

Thus, it may be readily seen that the rear end of the conveyor assembly 72 is mounted for substantially vertical free sliding movement in the notches 92 and that the forward lower end of the conveyor assembly 72 is mounted for free swinging movement about the axis of rotation defined by the shaft 82 by means of the pins or rods 94 being slidably received in the notches 96. It will be noted that the conveyor assembly 72 is normally urged to a lowermost position defined by the lowermost extremities of the notches 92 and 96 by means of its weight and that the forwardmost lower end of the conveyor assembly 72 may readily pivot upwardly about the axis of rotation defined by the shaft 82 upon the engagement of a round bale 98 by the forward lower end of the conveyor assembly 72.

From FIGURE 4 of the drawings it may be seen that the frame 80 is provided with a pair of journal members 100 which are supported from the transverse frame member 78 and rotatably journal the shaft 84 at points spaced longitudinally along its mid-portion. In addition, a pair of journal members 102 are supported from the rear transverse frame member 76 and it is to be understood that the conveyor assembly 26 includes similar journal portions for the shafts 34 and 36.

Further, it may be observed from FIGURE 4 that the conveyor assembly 72 includes upper and lower guide means 104 and 106 respectively for supporting and guiding the upper and lower reaches of the endless flexible member 88. The spatial relationship of the guide means 104 and 106 may be adjusted by means of mounting bolts 108 and it may be observed from FIGURE 3 of the drawings that the lower conveyor assembly 26 also includes guide means 110 for guiding the upper reaches of the endless flexible member 40. In addition, a plurality of tensioning rollers 112 are each supported by means of an inverted U-shaped bracket 114 from a transverse frame member 116, see FIGURE 2, supported from the frame 12 and normally urged to a lowermost position by means of compression springs 118. The rollers 112 engage the lower reach of the endless flexible member 40 and maintain proper tensioning of the endless flexible members 40.

From FIGURE 1 of the drawings it will be noted that the shaft 34 also has a drive pulley 120 mounted thereon which is drivingly connected to a driven pulley 122 mounted on the uppermost shaft 82 of the conveyor assembly 72 by means of an endless flexible member 124. It will be noted that the endless flexible members 40 and 88 move in opposite directions but at the same speed and that the pickup drum 58 rotates in a direction corresponding to the direction of rotation of the shafts 34 and 36.

Accordingly, from FIGURE 2 of the drawings it will be observed that the forward lowermost end of the conveyor assembly 72 first engages a round bale 98 while being pulled forwardly over the ground 70. The rate of movement of the endless flexible member 88 is substantially equal to the rate of forward movement of the trailer 12 so that the bale-engaging elements 90 do not move horizontally relative to the ground 70 but only vertically throughout the movement of the lower reach of the endless flexible member 88. Accordingly, the bale-engaging elements 90 engage the bale 98 and prevent the latter from being bumped and rolled forwardly by any portion of the hay bale loader 10. Then, as the bale 98 engages the pickup drum 58, the pickup drum together with the lower reach of the endless flexible member 88 will move the bale 98 to a position between the lower and upper reaches of the upper and lower conveyor assemblies 72 and 26 respectively without rolling the bale 98 about its longitudinal axis. Then, the bale 98 is moved upwardly between the conveyor assemblies 26 and 72 to the upper discharge end of the hay bale loader 10 whereupon it may be discharged into a suitable collection means such as a load trailer.

If the bale 98 is larger than usual, the forward end of the conveyor assembly 72 will merely swing upwardly by means of the notches or slots 96. It will be observed that the forward lowermost end of the conveyor assembly 72 terminates forwardly of a plane extending transversely of the hay bale loader 10 and disposed at substantially right angles to the conveyor assembles 26 and 72. In this manner, the distance between the forwardmost end of the conveyor assembly 72 and the ground 70 is slightly less than the minimum distance between the conveyor assemblies 72 and 26. In this manner, it may be assured that even smaller bales may be properly handled by the hay bale loader.

With attention now directed to FIGURES 2 and 3 of the drawings it will be noted that a pair of tensioning rollers 126 are supported from a generally inverted U-shaped bracket 128 carried by the frame 80 of the upper conveyor assembly 72 by means of substantially inverted U-shaped mounting members 130 which are urged toward uppermost positions by means of compression springs 132. The upper reaches of the endless flexible members 88 pass over the tensioning rollers 126 and in this manner the elongated flexible members 88 are properly tensioned.

If for any reason during the operation of the hay bale loader 10 it is desired to stop rotation of the power take-off shaft 22, the power take-off of the draft implement may be disengaged. Thus, workers on the wagon behind the hay bale loader 10 may be afforded time to place the bales on the wagon in a manner which will enable the wagon to carry more bales.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hay bale loader comprising a wheeled trailer frame adapted to be towed behind a draft vehicle, inclined upper and lower generally parallel and elongated conveyor assemblies each including an endless flexible member dispsoed in upper and lower reaches, means mounting opposite ends of said upper conveyor for guided lateral movement toward and away limit positions of movement toward corresponding ends of said lower conveyor, drive means carried by said trailer frame, means drivingly connecting said drive means to said conveyor assemblies for driving said flexible members at a speed approximately equal to the ground speed of said frame, each of said endless flexible members including outwardly projecting longitudinally spaced hay bale-engaging elements, the lower terminal end of said upper conveyor assembly being disposed for engagement with rolled hay bales and terminating in a plane disposed at right angles relative to the longitudinal center lines of said assemblies and spaced forwardly of the forward end of said lower conveyor assembly.

2. The combination of claim 1 including a skid carried by and projecting forwardly of said lower conveyor assembly and adapted to engage the ground over which said trailer moves to maintain the endless flexible member of said lower conveyor in spaced relation to the ground.

3. The combination of claim 2 wherein the lower limit position of movement of the lower end of said upper conveyor assembly toward the lower end of the lower conveyor assembly positions the lower terminal end of the upper endless flexible members more closely adjacent the ground over which said trailer frame passes than the spatial relationship of said conveyor assemblies to each other.

4. The combination of claim 1 including a pickup drum supported from and forwardly of the lower terminal end of said lower conveyor assembly and rearwardly of said plane for rotation about a horizontally disposed axis extending transversely of said assemblies, means drivingly connecting said drum to said drive means.

5. The combination of claim 4 wherein said pickup drum includes generally radially and outwardly projecting ribs extending longitudinally of said drum.

6. The combination of claim 1 wherein said mounting means includes means mounting the upper rear end of said upper conveyor for substantially vertical movement relative to said lower conveyor and means mounting the lower forward end of said upper conveyor for generally swinging movement relative to said lower conveyor about a horizontal axis extending transversely thereof and generally through the point of connection of the upper end of said upper conveyor with said frame.

7. The combination of claim 6 wherein said endless flexible members are drivingly connected for simultaneous operation at substantially equal speed.

8. The combination of claim 7 wherein said drive means comprises means adapted to be drivingly connected to the power take-off of said draft vehicle.

References Cited in the file of this patent

UNITED STATES PATENTS

| | | |
|---|---|---|
| 216,126 | Ainsworth | June 3, 1879 |
| 1,289,169 | Henderson | Dec. 31, 1918 |
| 2,410,238 | Ringrose | Oct. 29, 1946 |
| 2,916,137 | Hume | Dec. 8, 1959 |
| 3,017,008 | Olson | Jan. 16, 1962 |

FOREIGN PATENTS

| | | |
|---|---|---|
| 530,730 | Canada | Sept. 25, 1956 |